(12) United States Patent
Hartmann

(10) Patent No.: US 7,225,546 B2
(45) Date of Patent: Jun. 5, 2007

(54) RECIPROCATING POWER SAW WITH SECONDARY BEARING ELEMENT

(75) Inventor: Markus Hartmann, Mauerstetten (DE)

(73) Assignee: Hilti Aktiengesellschaft, Schaan (LI)

( * ) Notice: Subject to any disclaimer, the term of this patent is extended or adjusted under 35 U.S.C. 154(b) by 16 days.

(21) Appl. No.: 10/738,328

(22) Filed: Dec. 17, 2003

(65) Prior Publication Data

US 2004/0181952 A1    Sep. 23, 2004

(30) Foreign Application Priority Data

Dec. 19, 2002   (DE)  ................................ 102 59 568

(51) Int. Cl.
*B27B 3/00* (2006.01)
(52) U.S. Cl. .......................................... 30/393; 30/394
(58) Field of Classification Search .......... 30/391–394; 173/162.1, 162.2, 210; 83/646–647; 277/614, 277/910, 641–643; 285/918, 344
See application file for complete search history.

(56) References Cited

U.S. PATENT DOCUMENTS

| | | | | |
|---|---|---|---|---|
| 3,945,120 A * | 3/1976 | Ritz | ............................. | 30/393 |
| 4,337,563 A * | 7/1982 | Becker et al. | ................. | 29/451 |
| 5,009,012 A * | 4/1991 | Martinez et al. | ............... | 30/394 |
| 5,050,307 A * | 9/1991 | Palm | ............................ | 30/392 |
| 5,212,887 A * | 5/1993 | Farmerie | ...................... | 30/393 |
| 5,450,925 A * | 9/1995 | Smith et al. | .................... | 184/5 |
| 6,249,979 B1* | 6/2001 | Bednar et al. | ................. | 30/392 |
| 6,688,005 B1* | 2/2004 | Tachibana et al. | ............ | 30/392 |
| 6,810,589 B2* | 11/2004 | Lagaly et al. | .................. | 30/392 |
| 2001/0034941 A1* | 11/2001 | Bednar et al. | ................. | 30/392 |

* cited by examiner

*Primary Examiner*—Kenneth E. Peterson
*Assistant Examiner*—Phong Nguyen
(74) *Attorney, Agent, or Firm*—Abelman, Frayne & Schwab

(57) ABSTRACT

A reciprocating power saw, in particular a saber saw, with a housing (1), a motor-driven reciprocating stroke bar (2) that has a tool receptacle (3) at its free end, and a bearing means (4), which axially displaceably and pivotably bears the stroke bar (2) in the tool-side end zone of the housing (1). The bearing means (4) has a guide part (5) with a bearing passage (6) for receiving the stroke bar (2), wherein the bearing means (4) is mounted by an elastic secondary bearing element (8) in a receiving passage (7) in the housing (1).

11 Claims, 3 Drawing Sheets

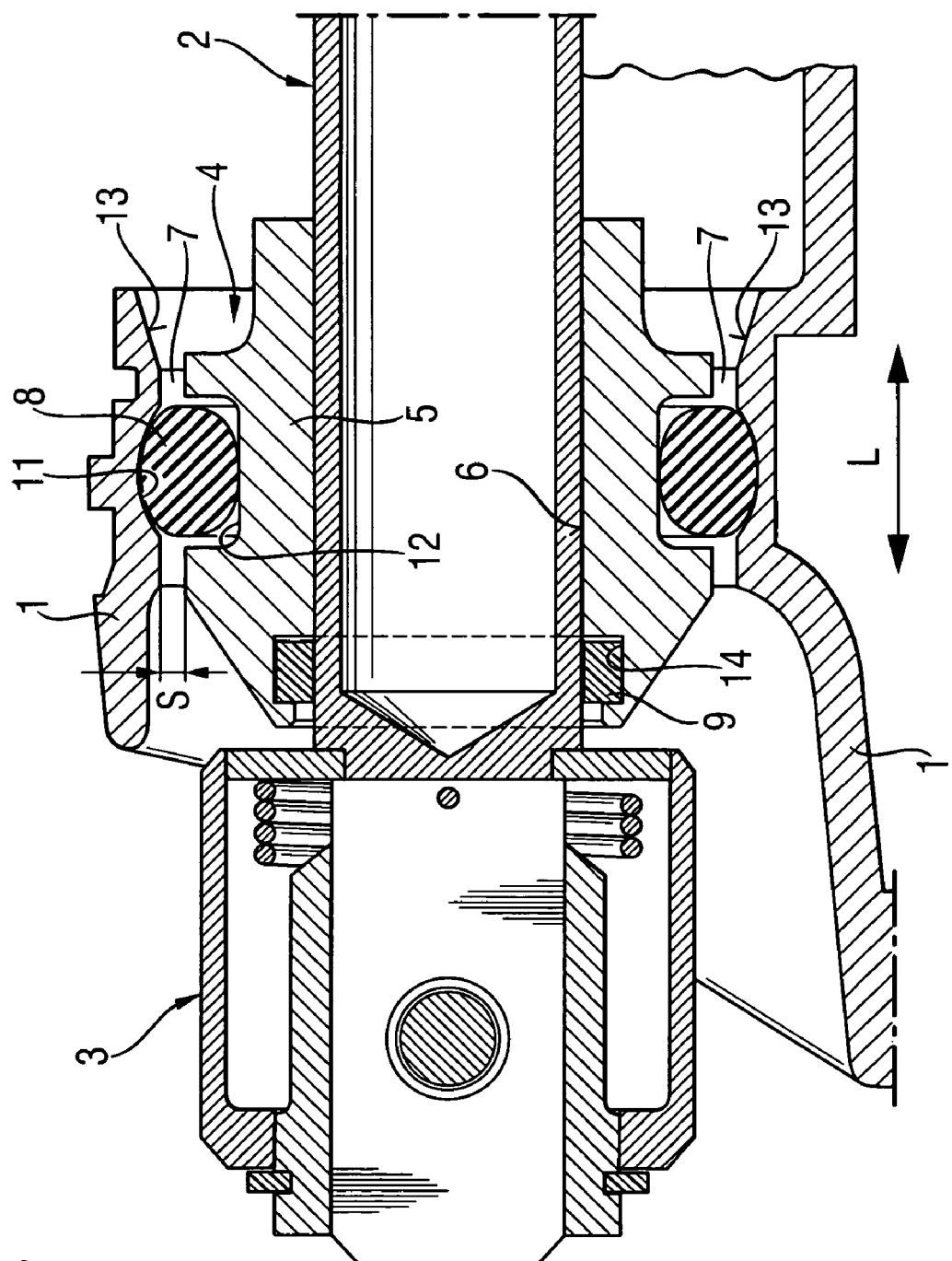

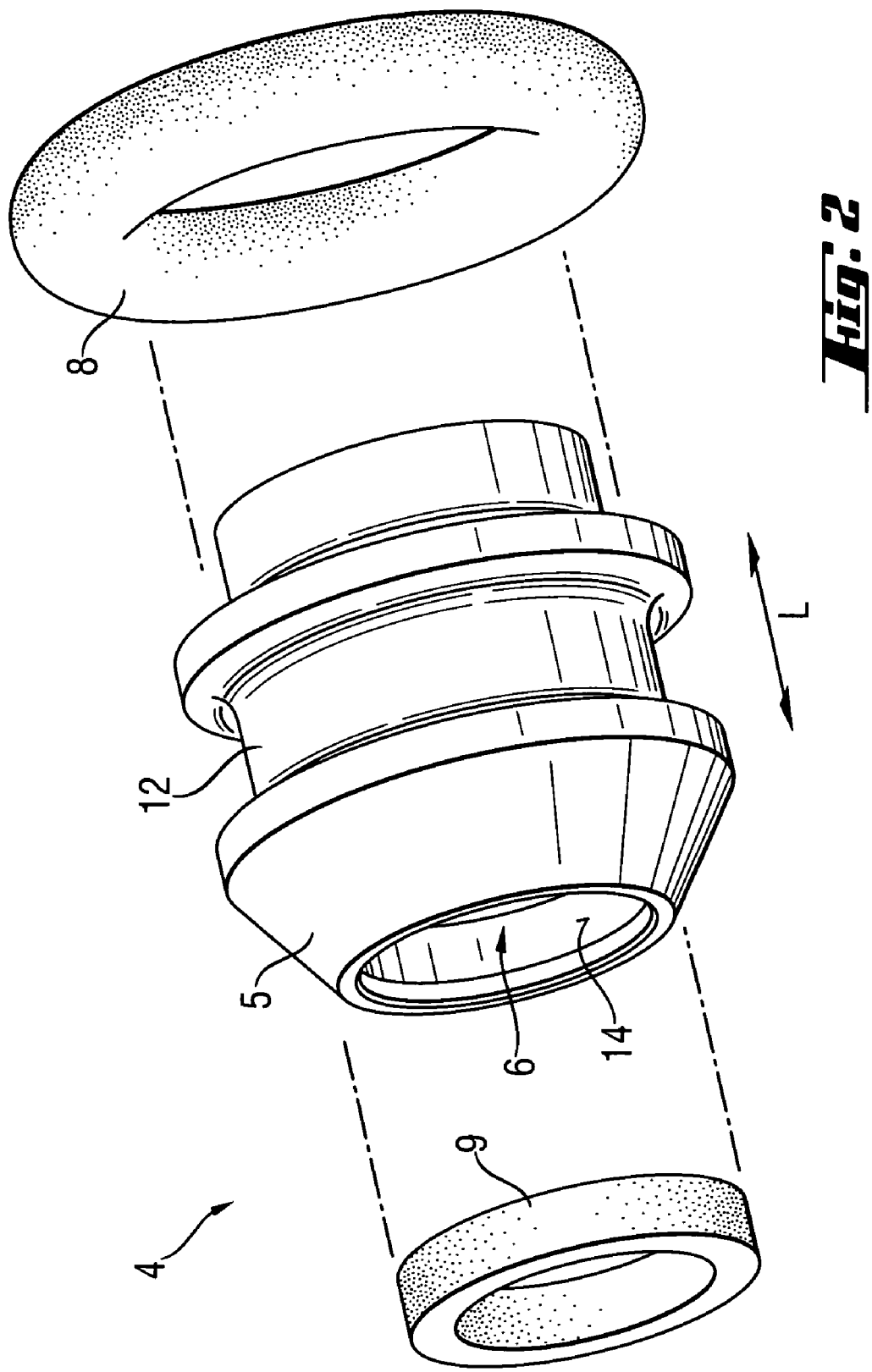

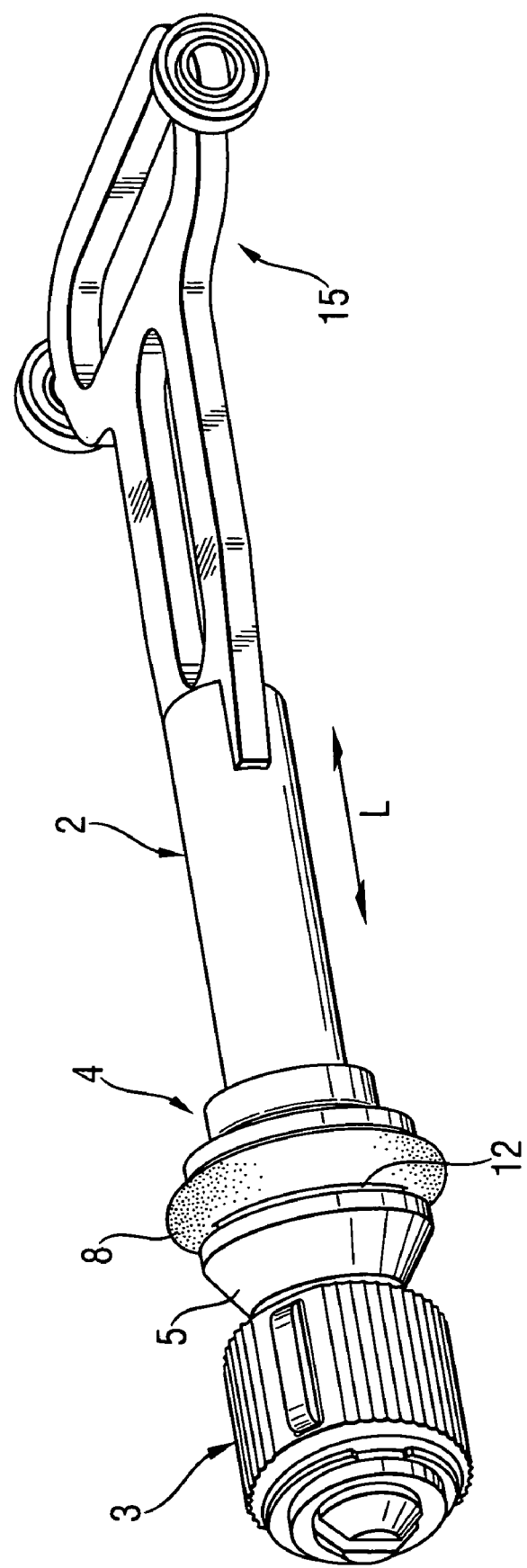

RECIPROCATING POWER SAW WITH SECONDARY BEARING ELEMENT

BACKGROUND OF THE INVENTION

The invention relates to a reciprocating power saw, in particular a saber saw or the like, having a housing, a motor driven, reciprocating stroke bar, which has a tool receptacle at its free end and a bearing means, which axially displaceably and pivotably bears the stroke bar in the tool-side end zone of the housing, wherein the bearing means has a guide part with a mounting passage for receiving the stroke bar.

Reciprocating power saws, in particular saber saws, of the aforementioned type are used in working work pieces or the like. A motor-driven stroke bar is mounted in a housing and a tool receptacle is provided at its free end for receiving a tool, in particular a saw blade. The reciprocating displaceable stroke bar is mounted with its tool-side end zone axially displaceable and pivotable in the housing by a bearing means. For increasing the cutting performance of the reciprocating power saw, the reciprocating movement is superimposed by a movement component transverse to the reciprocating movement. In particular in the presence of the additional movement component transverse to the stroke bar, the stroke bar must be mounted on the housing to be pivotable.

U.S. Pat. No. 3,945,120 discloses a reciprocating power saw having a housing, a motor-driven reciprocating stroke bar, which has a tool receptacle at its free end. In addition, the reciprocating power saw has a bearing means with a guide part having a bearing passage, which has a spherical external contour. The guide part is mounted in the housing such that it can be pivoted.

The drawback in the known solution is that the guide part must be precision manufactured, because the inside of the housing, in particular the drive zone, must be sealed to prevent leakage of oil or grease.

An additional drawback in the known solution is that in the wear of the guide part no precise bearing of the stroke bark in the housing is assured and as a result, the service life is shortened and noise production increases due to the moving stroke bar.

Furthermore oscillations occurring at the stroke bar bearing are transmitted directly to the housing resulting in stress to the operator.

SUMMARY OF THE INVENTION

The object of the present invention is to provide a reciprocating power saw, in particular a saber saw, that is economical to manufacture and that assures increased operating comfort with low maintenance expenditure.

According to the invention, this object is achieved by bearing means mounted by an elastic secondary bearing element in a receptacle passage in the housing.

Since the mounting means has a secondary mounting element, manufacturing is economical and service life is long. The stroke bar is mounted in the bearing passage of the guide part, which is in turn mounted elastically in the housing by the secondary element. The secondary element assumes the sealing function between the housing and the guide part to prevent escape of oil and/or grease from the inside of the housing to the outside. Advantageously, the bearing passage has an inside contour configured to be complementary to the outside contour of the stroke bar, in particular a cylinder sleeve like inside contour, to assure optimum sealing. In addition, the receiving passage preferably has an inside contour that is configured complementary to the outside contour of the guide part, in particular a cylindrical inside contour, to provide optimum sealing.

Preferably the secondary bearing element is comprised at least in part of an elastic material such as rubber, for example, or the like to make economical manufacture of the secondary element possible.

The receiving passage advantageously has a peripheral bearing groove for zonal receiving the secondary bearing element over its inside periphery to assure a precise and impact-resistant mounting of the secondary element.

Preferably, the guide part has a peripheral counter-bearing groove for zonal receiving he secondary bearing element over its external periphery to assure precise guiding and bearing of the secondary bearing element in cooperation with the bearing groove.

The secondary bearing element advantageously has a rounded cross-section transverse to the longitudinal sense of the stroke bar. "Rounded" is understood to mean that in an essentially angular cross-section, such as rectangular, triangular or other polygon, the "corners" are configured on the outer and/or inner periphery as a circular segment. When this is done, in the cross-sections, an optimum seal is assured in the bearing passage even at the corners. Accordingly, the secondary element is configured with an outer contour that is complementary to the inner contour of the bearing passage.

Advantageously, the secondary bearing element, as well as the bearing groove receiving same and the counter-bearing groove are configured circular, to assure a uniformly high-grade seal over the entire inner and outer periphery. The cross-section of the circular secondary element can have all possible and appropriate shapes such as oval, triangular, rectangular or other polygon shape. The bearing groove and the counter bearing groove have respective shapes, in their cross-section, which are complementary to the part of the secondary bearing element with which they cooperate.

Preferably, the secondary bearing element is an O-ring to assure economical manufacture of the bearing means.

Advantageously, the receiving passage has an insertion slot at an axial end, whose inside diameter is larger than the outside diameter of the tool-side axial end of the guide part and is at least zonal smaller than the outside diameter of the secondary bearing element to assure a simple and consequently economical final assembly of the bearing means in the housing, in particular in the receiving passage. The preferably conical or funnel-shaped insertion slot makes it possible for the guide part mounted on the stroke bar to be pushed in through the insertion slot into the receiving passage.

The bearing means preferably has a seal, that is mounted in the bearing passage and seals the same relative to the stroke bar.

Advantageously, the bearing passage has a peripheral running groove for receiving the seal, over its inside periphery, to assure a reliable and precise mounting of the seal in the bearing passage.

The seal and the groove are of a circular configuration to provide a uniformly high-grade sealing relative to the stroke bar over the entire inside periphery of the bearing means. The cross-section of the circular seal can have all possible and appropriate shapes such as oval, triangular, rectangular or other polygon shape. The groove has, in its cross-section, the respective form that is complementary to the part of the seal with which it cooperates.

BRIEF DESCRIPTION OF THE DRAWINGS

The invention will be more completely described with reference to the drawings, wherein:

FIG. 1 shows a longitudinal section through the tool-side end zone of the housing with the bearing means, according to the invention;

FIG. 2 shows a perspective exploded representation of the bearing means represented in FIG. 1; and FIG. 3 shows a perspective view of the stroke bar represented in FIG. 1 with pre-assembled bearing means.

DETAILED DESCRIPTION OF THE INVENTION

FIGS. 1 to 3 show a bearing means 4 of a reciprocating power saw according to the invention, in particular a saber saw or the like, having a housing 1, a motor-driven reciprocal stroke bar 2, which has a tool receptacle 3 at its free end. The bearing means 4 axially displaceable and pivotably bears the stroke bar 2 in the tool-side end zone of the housing, wherein the bearing means 4 has a guide part 5 having a bearing passage 6 for receiving the stroke bar 2.

The bearing means 4 is mounted by an elastic secondary element 8 in a cylindrical receiving passage 7, for example, in the housing 1. The secondary bearing element 8 is configured as an O-ring and made out of rubber. The secondary bearing element 8 has a rounded cross-section transverse to the longitudinal direction L of the stroke bar 2. The essentially cylindrical receiving passage 7 has a bearing groove 11 running radially peripheral over its entire inside periphery for receiving the secondary bearing element 8, which cooperates with a counter-bearing groove 12 that runs radial and is arranged on the external periphery of the guide part 5. The two grooves 11, 12 situated opposite to each other form a bearing space for the secondary bearing element 8 and affix same axially relative to the stroke bar 2. In the assembled state, the guide part 5 and the receiving passage 7 have a clearance S relative to each other, such that the two parts are pivotal, in particular of the guide part 5, relative to the housing 1. Advantageously, the maximum pivot angle is 5°.

The receiving passage 7 has a funnel-shaped insertion slot 13, on the axial end facing away from the tool-side, whose inside diameter is larger than the outside diameter of the tool-side axial end of the guide part 5 and is at least smaller than the outside diameter of the secondary bearing element 8. The insertion slot 13 tapers in the direction of the tool-side. In the rest of the radial projection zone of the guide part 5, the receiving passage 7 is advantageously configured to be cylindrical.

The bearing means 4 has a seal 9 in the form of a discoid ring, which is mounted in the bearing passage 6 in a groove 14 running radially peripheral and seals same relative to the stroke bark 2. The groove 14 extends over the entire inside periphery of the bearing passage 6 and has an essentially rectangular radial cross-section, as represented in FIG. 1.

FIG. 3 shows the stroke bar 2 with a pre-assembled guide part 5 and the secondary bearing element 8 mounted in the counter-bearing groove. At its free end, the stroke bar 2 has the tool receptacle 3 for removable attachment of a saw blade (not shown) and at the opposite end, a drive part 15.

What is claimed is:

1. A reciprocating power saw comprising a housing (1) having a receiving passage (7), a motor-driven reciprocating stroke bar (2) with a tool receptacle (3) arranged at a free end of the stroke bar (2), and a bearing means (4) mounted in the receiving passage for supporting the stroke bar (2) in tool-side end zone of the housing (1) axially displaceable and pivotable, wherein the bearing means (4) has a guide part (5) with a bearing passage (6) for receiving the stroke bar (2), and wherein the bearing means (4) is mounted in the receiving passage (7) of the housing (1) by an elastic secondary bearing element (8) and wherein the secondary bearing element (8) is formed by a single circular ring and has a wall cross-section in a longitudinal direction of the stroke bar that is one of circular, oval and polygon, and wherein the receiving passage (7) has a peripheral bearing groove (11) on an inside periphery for receiving the secondary bearing element (8) and having length in the longitudinal direction of the stroke bar that commensurates with a dimension of the secondary bearing element in the same direction.

2. The reciprocating power saw of claim 1, wherein the secondary bearing element (8) is made at least in part of an elastic material.

3. The reciprocating power saw of claim 1 wherein the guide part (5) has a peripheral counter bearing groove (12) on an external periphery for receiving the secondary bearing element (8) and having a length in the longitudal direction of the stroke bar that substantially corresponds to the length of the peripheral bearing groove (11).

4. The reciprocating power saw of claim 3, wherein, the secondary bearing element (8) has a rounded cross-section transverse to the longitudinal direction (L) of the stroke bar (2).

5. The reciprocating power saw of claim 4, wherein the secondary bearing element (8) and the bearing groove (11) and the counter bearing groove (12) receiving the bearing element (8) are all circular.

6. The reciprocating power saw of claim 5, wherein the secondary bearing element (8) is an O-ring.

7. The reciprocating power saw of claim 5, wherein the receiving passage (7) has an insertion slot (13) at one axial end with an inside diameter that is larger than the outside diameter of the tool-side axial end of the guide part (5) and at least smaller than the outside diameter of the secondary bearing element (8).

8. The reciprocating power saw of claim 7, wherein the bearing means (4) has a seal (9) that is mounted in the bearing passage (6) and seals the hearing passage (6) relative to the stroke rod (2).

9. The reciprocating power saw of claim 8, wherein the bearing passage (6) has at a peripheral running groove (14) at an inside periphery for receiving the seal (9).

10. The reciprocating power saw of claim 9, wherein the seal (9) and the groove (14) are ring-shaped.

11. The reciprocating power saw of claim 1, wherein the peripheral bearing groove (11) has a longitudinal contour that substantially corresponds to a longitudinal contour of the secondary bearing element (8).

* * * * *